(12) United States Patent
Kawaguchi et al.

(10) Patent No.: US 7,206,512 B2
(45) Date of Patent: Apr. 17, 2007

(54) METHOD OF CONTROLLING OPTICAL WAVELENGTH DIVISION MULTIPLEXING TRANSMISSION APPARATUS

(75) Inventors: Akihisa Kawaguchi, Kawasaki (JP); Kazuhiro Minamimoto, Kawasaki (JP); Eisaku Touma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 10/835,381

(22) Filed: Apr. 30, 2004

(65) Prior Publication Data

US 2004/0202469 A1    Oct. 14, 2004

Related U.S. Application Data

(63) Continuation of application No. 09/419,872, filed on Oct. 19, 1999, now abandoned.

(30) Foreign Application Priority Data

Dec. 18, 1998  (JP) .................................. 10-361499
Sep. 6, 1999   (JP) .................................. 11-251396

(51) Int. Cl.
H04J 14/02  (2006.01)
H04B 10/00  (2006.01)
H04B 10/02  (2006.01)
H04B 10/12  (2006.01)
H01S 3/00   (2006.01)

(52) U.S. Cl. .......................... 398/79; 398/97; 398/158; 398/160; 398/177; 359/337.12; 359/341.41; 359/341.42

(58) Field of Classification Search .................. 398/79, 398/97, 158, 160, 177; 359/337.12, 341.33, 359/348, 349, 341.41, 341.42
See application file for complete search history.

(56) References Cited

U.S. PATENT DOCUMENTS 5,966,237 A * 10/1999 Sugaya et al. ......... 359/341.41
6,025,947 A    2/2000 Sugaya et al. .............. 359/160
6,094,296 A    7/2000 Kosaka ....................... 359/341
6,288,836 B1 * 9/2001 Kawasaki et al. ...... 359/341.42
6,466,348 B1 10/2002 Izumi ......................... 359/177

FOREIGN PATENT DOCUMENTS

JP     10-060068     2/1999

OTHER PUBLICATIONS

U.S. Appl. No. 09/419,872, filed Oct. 19, 1999, Kawaguchi.

* cited by examiner

*Primary Examiner*—M. R. Sedighian
(74) *Attorney, Agent, or Firm*—Staas & Halsey LLP

(57) ABSTRACT

A method of controlling an optical wavelength division multiplexing transmission apparatus achieves stable wavelength division multiplexing optical transmission by switching a control mode of an optical amplification section in accordance with an input state of optical signals of various wavelengths. Accordingly, the method involves, upon startup of the optical wavelength division multiplexing transmission apparatus, initial setting of information such as the wavelengths being used and the number of wavelengths being used, setting the amount of optical attenuation for each wavelength to a maximum value, and setting an optical amplification unit to ALC. Then, upon input of an optical signal corresponding to the wavelengths being used, the amount of optical attenuation corresponding to the input optical wavelength is controlled so that the levels of the input optical signals analyzed by the spectral analysis unit are approximately constant; and moreover, so that the input optical level per single wavelength input into the optical amplification unit is of a level which corresponds with the number of wavelengths being used. Then the apparatus shifts to normal operating conditions. Next, when the number of wavelengths being input varies, the optical amplifier is switched to AGC, and after the power level of the optical signal of each wavelength is adjusted, the optical amplifier is switched to ALC again.

7 Claims, 8 Drawing Sheets

FIG.3
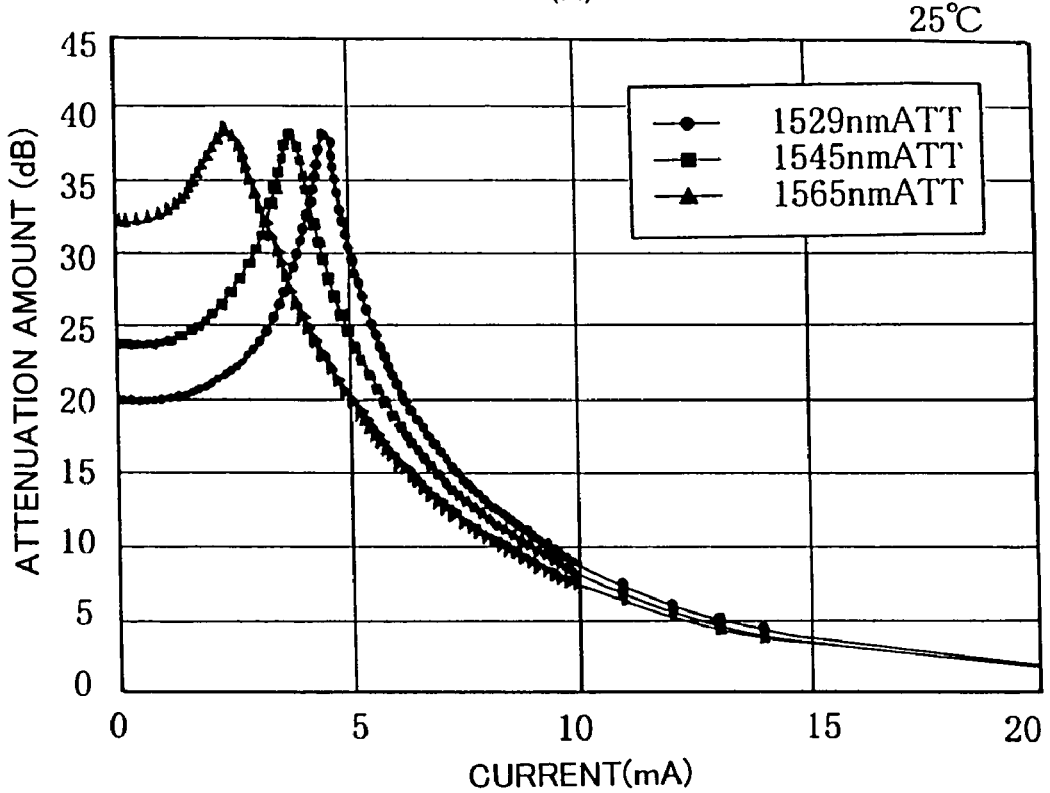
(A) 25°C
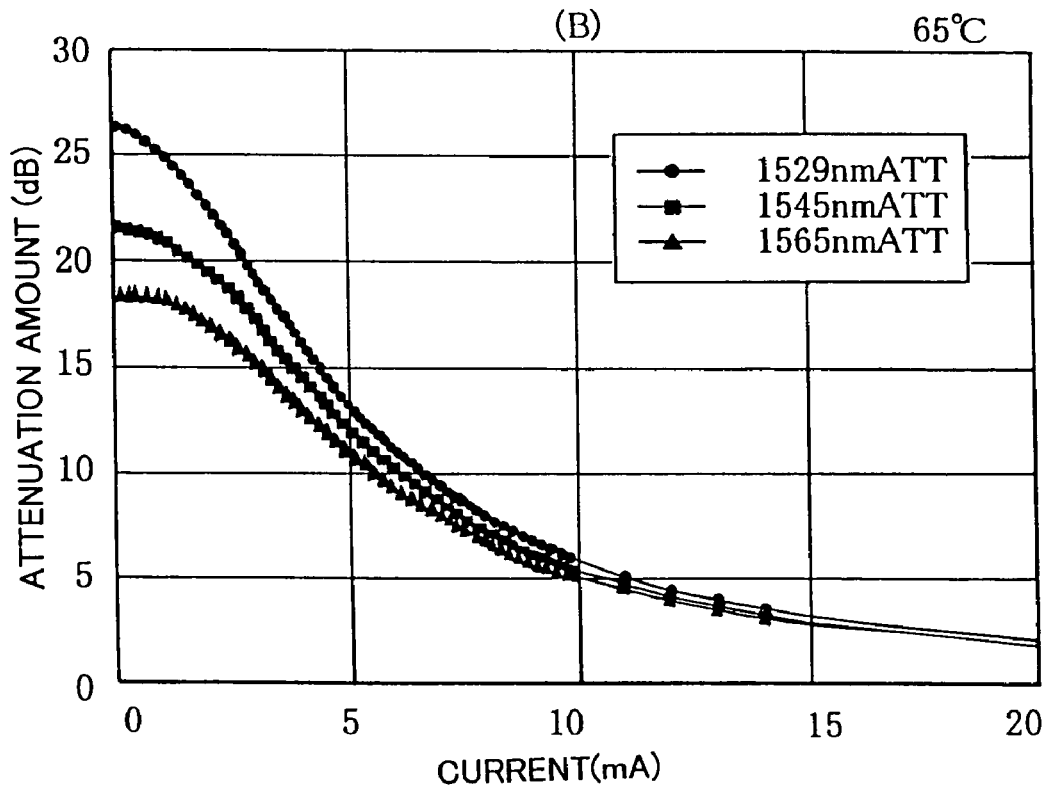
(B) 65°C

FIG.6
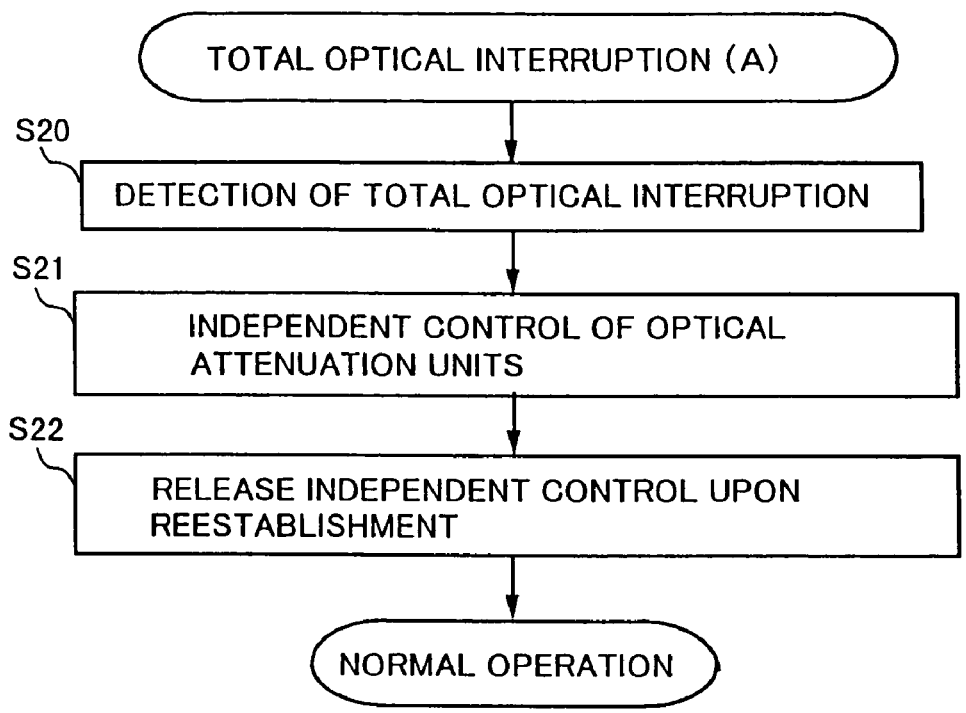
(A)
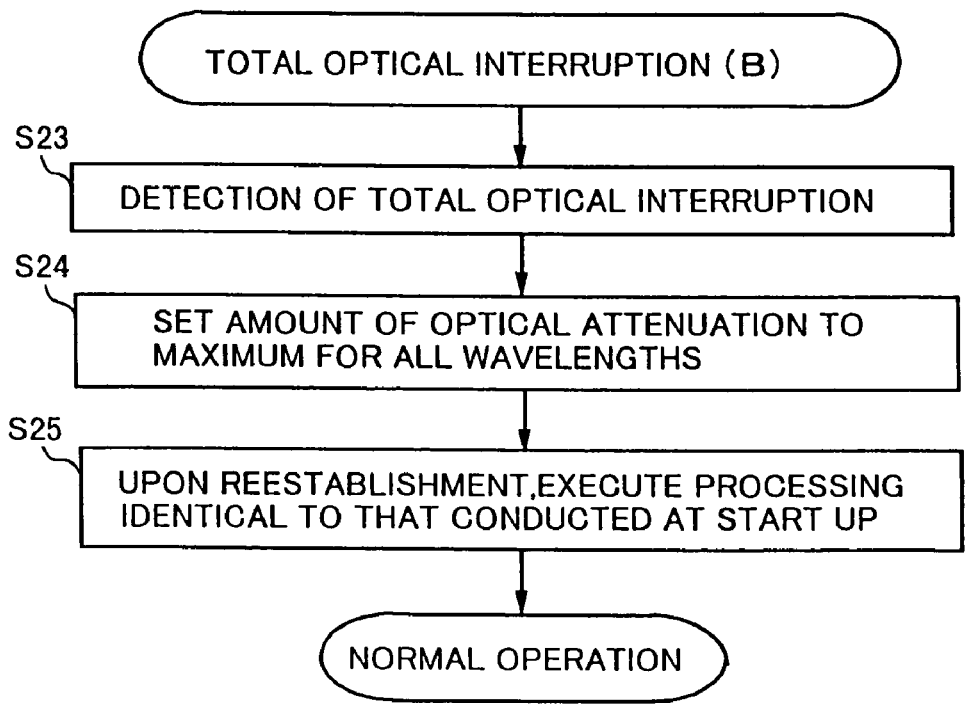
(B)

METHOD OF CONTROLLING OPTICAL WAVELENGTH DIVISION MULTIPLEXING TRANSMISSION APPARATUS

CROSS REFERENCE TO RELATED APPLICATIONS

This application is a continuation of application Ser. No. 09/419,872 filed Oct. 19, 1999 now abandoned. The '872 application claims priority to Japanese Patent Application 10-361499 filed Dec. 18, 1998 and Japanese Patent Application 11-251396 filed Sep. 6, 1999.

BACKGROUND OF THE INVENTION

1. Field of the Invention

The present invention relates to a method of controlling an optical wavelength division multiplexing transmission apparatus used in an optical transmission system, and in particular to a method of controlling an optical wavelength division multiplexing transmission apparatus which achieves stable wavelength division multiplexing optical transmission by switching the control mode of an optical amplification unit provided inside the optical wavelength division multiplexing transmission apparatus in accordance with an input state of optical signals of various wavelengths.

2. Description of the Related Art

Wavelength division multiplexing (WDM) optical transmission systems which transmit a wavelength division multiplexed optical signal comprising a plurality of optical signals of different wavelengths through a single transmission path are being taken notice as a method for achieving increased capacity in optical transmission systems. Furthermore the development of WDM optical transmission systems, which utilize an optical amplification repeater transmission mode in which an optical amplifier is used as a linear repeater, is also processing rapidly. For example, systems are being investigated which are capable of achieving optical amplification repeater transmission at transmission speeds totaling 320 Gbps, by using 32 optical signal waves of transmission speed 10 Gbps and multiplexing the 32 optical signals.

A terminal apparatus appropriate for use at the transmission end of a WDM optical transmission system as described above will be equipped with, for example, an electro-optical converting apparatus for converting an electrical signal into a narrow spectrum optical signal on the wavelength grid prescribed by ITU-T, as well as an optical wavelength division multiplexing transmission apparatus for multiplexing and then transmitting the optical signals of each wavelength output from the electro-optical converting apparatus. A specific example of the construction of an optical wavelength division multiplexing transmission apparatus is shown in FIG. 8.

With the construction shown in FIG. 8, each optical signal of different wavelength output from the electro-optical converting apparatus passes through a corresponding optical attenuation unit (VAT) and is then input into an optical multiplexing unit (TWM) and multiplexed. The wavelength division multiplexed optical signal output from the optical multiplexing unit is amplified to the desired level by an optical amplification unit (TWA) and then transmitted to an external optical transmission path or the like. Furthermore, a portion of the wavelength division multiplexed optical signal output from the optical amplification unit is sent to a spectral analysis unit (SAU) where a spectral analysis is conducted and the amount of optical attenuation at each of the optical attenuation units then controlled in accordance with the results of the spectral analysis. Moreover, the optical amplification unit is subject to automatic level control (ALC) in steady state conditions, so that the level of the optical output is controlled to give a constant level set in accordance with the number of wavelengths being used.

However, with optical transmission apparatus like those described above, a problem arises in that if an increase or a decrease in the number of optical wavelengths being input occurs while the optical amplification unit is operating under ALC, then the optical amplification unit will function so as to maintain the optical output at a constant level regardless of the level of the optical input, and consequently the optical output level per single wavelength will fluctuate. As a result, the operation of repeater devices or a receiving end terminal apparatus connected to the optical wavelength division multiplexing transmission apparatus will also be affected, resulting in a potential deterioration in the transmission properties.

In order to resolve the aforementioned problem, it is possible for example, to interrupt the ALC operation of the optical amplification unit during increases or decreases in the number of wavelengths being input, and then subsequently alter the operating conditions of the optical amplification unit so that an optical output level per single wave which corresponds to the new number of wavelengths after increased or decreased is achieved. However, if the optical output level is adjusted simply by varying the gain of the optical amplification unit, then the deviation (tilt) of the gain between each different wavelength will also vary, making it difficult to maintain at a constant level the optical level of each wavelength of the amplified wavelength division multiplexed optical signal. Until now, no specific control method has been proposed which produces no fluctuation in the optical level per single wave of a wavelength division multiplexed optical signal output from an optical amplification unit, and yet is able to maintain the optical level of each wavelength at a constant level.

SUMMARY OF THE INVENTION

It is an object of the present invention to resolve the above issues and provide a method of controlling an optical wavelength division multiplexing transmission apparatus which achieves stable wavelength division multiplexing optical transmission by switching the control mode of an optical amplification section in accordance with the input state of the optical signals of each wavelength entering the optical wavelength division multiplexing transmission apparatus.

In order to achieve the above object, with the present invention, there is provided a method of controlling an optical wavelength division multiplexing transmission apparatus which is equipped with an optical attenuation section for attenuating individually the power level of each of a plurality of input optical signals of different wavelengths, an optical multiplexing section for multiplexing the optical signals of each wavelength which have been attenuated by the optical attenuation section and generating a wavelength division multiplexed optical signal, an optical amplification section for amplifying the wavelength division multiplexed optical signal generated by the optical multiplexing section, and a spectral analysis section for analyzing the spectrum of the wavelength division multiplexed optical signal amplified by the optical amplification section, wherein the method comprises: an initial setting step which, upon startup of the optical wavelength division multiplexing transmission apparatus, sets initial information including the wavelengths being used and the number of wavelengths being used, sets the amount of optical attenuation corresponding to each wavelength of the optical attenuation section to a maximum value, and sets the operation of the optical amplification section to automatic level control (ALC), and a level adjustment step which, upon input of an optical signal of a wavelength corresponding to the wavelengths being used set in the initial information into the aforementioned optical attenuation section, controls the amount of optical attenuation corresponding to the wavelength of the optical signal being input into the optical attenuation section so that the power level of the optical signals of each wavelength analyzed by the spectral analysis section are approximately constant, and moreover so that the optical power level per single wavelength of the wavelength division multiplexed optical signal input into the aforementioned optical amplification section is of a level which corresponds with the number of wavelengths being used set in the initial information. The method may also incorporate an operation step which, based on the analysis results from the spectral analysis section, controls the amount of optical attenuation corresponding to the wavelength of the optical signal being input into the optical attenuation section, so that the level conditions adjusted by the level adjustment step are maintained.

With such a control method, upon startup of the optical wavelength division multiplexing transmission apparatus, control of the amount of optical attenuation of the optical attenuation section is carried out in accordance with the optical signal actually being input in conditions that the control mode of the optical amplification section is set to ALC. Then, when the optical level of each wavelength of the wavelength division multiplexed optical signal to be measured by the spectral analysis section is stabilized, the apparatus shifts to normal operating conditions. In this manner, the operation of the optical wavelength division multiplexing transmission apparatus, from the point of startup until normal operating conditions are achieved, is carried out automatically.

Furthermore with the above control method, it is also possible to incorporate a wavelength number variation processing step, which, upon a variation in the number of wavelengths being input during the aforementioned operation step, switches the operation of the optical amplification section from automatic level control to automatic gain control, and controls the amount of optical attenuation corresponding to the wavelength of the optical signal being input into the optical attenuation section so that the power level of the optical signal of each wavelength analyzed by the spectral analysis section following the wavelength number variation is approximately constant, and moreover so that the optical power level per single wavelength of the wavelength division multiplexed optical signal input into the optical amplification section is of a level which corresponds with the number of wavelengths following variation. Moreover, preferably the wavelength number variation processing step, upon any reduction in the number of input wavelengths, sets the amount of optical attenuation corresponding to the interrupted wavelengths of the optical attenuation section to a maximum value.

With such a control method, when the number of wavelengths being input (the number of signals in the optical input signal) varies, and for example an interruption occurs in the input of certain wavelength optical signals, or alternatively when such an input interruption is restored, then the optical amplification section switches to AGC, and the amount of attenuation at the optical attenuation section is controlled automatically in accordance with the new number of wavelengths (number of signals) following the variation.

In addition, with the above control method it is also possible to incorporate a spectral analysis anomaly processing step which upon occurrence of an anomaly in the analysis operation of the spectral analysis section during the operation step, controls the amount of optical attenuation corresponding to each wavelength in the optical attenuation section so that the level of the optical signal of each wavelength output from the optical attenuation section is maintained at the output level which existed immediately prior to the occurrence of the anomaly.

With such a control method, when an anomaly occurs in the spectral analysis section, regardless of the results of the spectral analysis, the optical attenuation section shifts to independent control and the conditions prior to the occurrence of the anomaly are retained.

Furthermore with the above control method, it is also possible to incorporate a supervisory control processing step which, when the operation of the optical amplification section is switched to either automatic level control or automatic gain control, generates a supervisory control signal, which shows at least the operating conditions of the optical amplification section following switching, and then send it to the transmission path. This supervisory control signal may be used for switching the operation of optical amplification sections incorporated in subsequent stage devices connected to the transmission path so as to match the operating conditions of the optical amplification section of the wavelength division multiplexing optical transmission apparatus. Specifically, it is preferable that the supervisory control processing step utilizes a supervisory control channel of different wavelength from the wavelengths of the optical signals incorporated in the wavelength division multiplexed optical signal, with the supervisory control signal to send to the optical transmission path together with the wavelength division multiplexed optical signal.

According to such a control method, with a switching of the control mode of the optical amplification section at the transmission end, in accordance with the supervisory control signal, the control mode of optical amplification sections provided in subsequent stage devices such as repeater devices or a receiving end terminal device are switched in the same way as the transmission end. Consequently, deterioration in the transmission properties of a wavelength division multiplexed optical signal resulting from a switch in the control mode at the transmission end can be prevented.

Other objects, aspects and advantages of the present invention will become apparent from the following description of embodiments given in conjunction with the appended drawings.

BRIEF DESCRIPTION OF THE DRAWINGS

FIG. 3 is a diagram showing an example of variation in the amount of optical attenuation in relation to an electrical current value in a variable optical attenuator used in the above embodiment, where (A) shows the relationship at 25° C. and (B) the relationship at 65° C.;

FIG. 6 is a flowchart showing a control method for the above embodiment in the case where an interruption occurs in an optical input, where (A) shows the situation for a fault in a spectral analysis unit, and (B) shows the situation when an anomaly occurs at a stage prior to the optical amplification unit;

DETAILED DESCRIPTION OF THE INVENTION

As follows is a description of an embodiment of the present invention based on the drawings.

Figure 1:
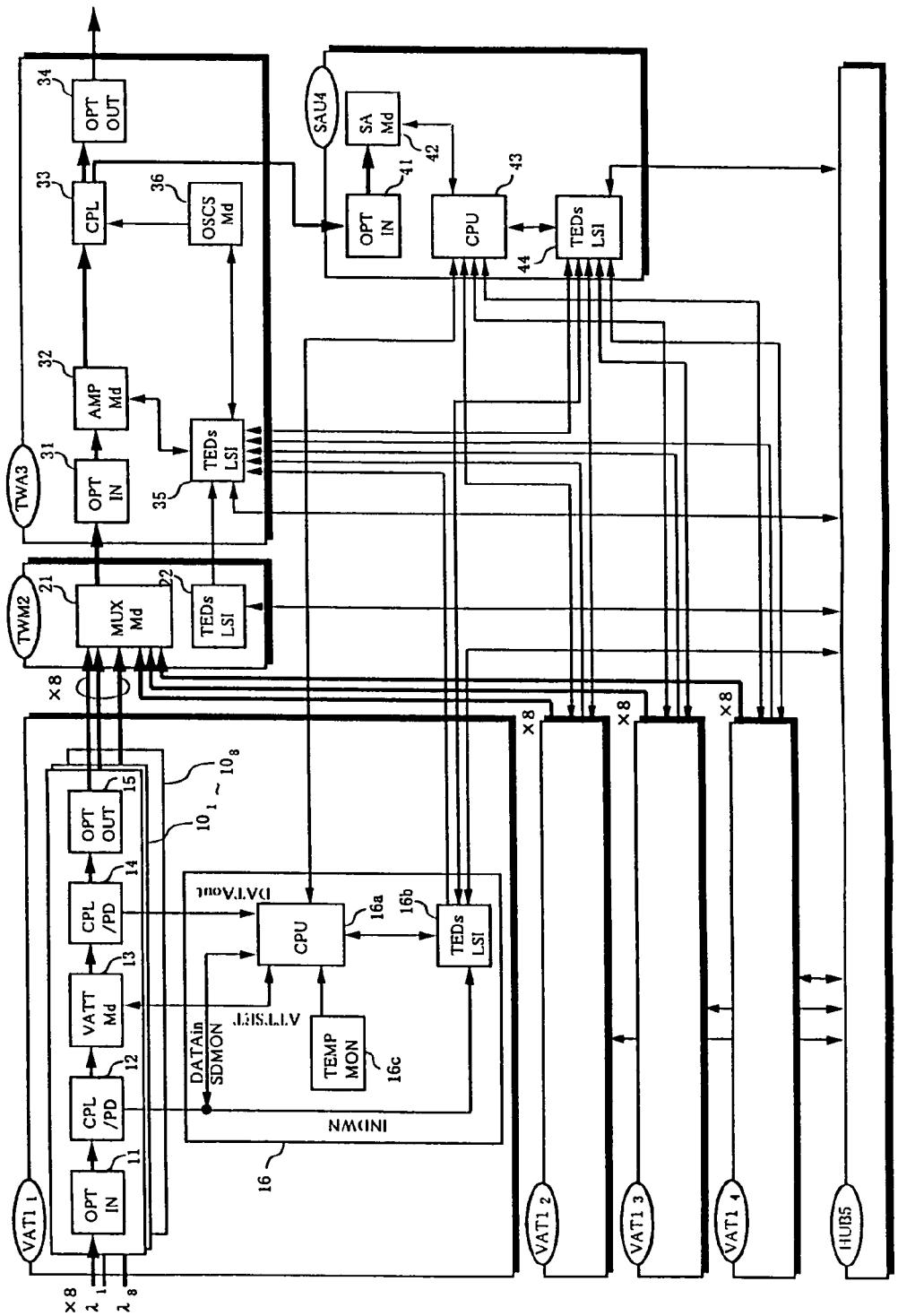
FIG. 1 is a block diagram showing the principal elements of an optical wavelength division multiplexing transmission apparatus to which a control method according to an embodiment of the present invention is applicable.

FIG. 1 is a block diagram showing the principal elements of an optical wavelength division multiplexing transmission apparatus to which a control method of the embodiment is applied. The optical wavelength division multiplexing transmission apparatus is provided inside a transmission end terminal apparatus of a WDM optical transmission system, and although not shown in the figure an electro-optical converting apparatus is also mounted inside the transmission end terminal apparatus.

The optical wavelength division multiplexing transmission apparatus shown in FIG. 1 is constructed for example of; four optical attenuation units (VAT) $1_1 \sim 1_4$ which function as an optical attenuation section into which are input optical signals of each wavelength output from an electro-optical converting apparatus, an optical multiplexing unit (TWM) 2 which functions as an optical multiplexing section into which are input the optical signals output from each of the optical attenuation units $1_1 \sim 1_4$, an optical amplification unit (TWA) 3 which functions as an optical amplification section for amplifying a wavelength division multiplexed optical signal output from the optical multiplexing unit 2, a spectral analysis unit (SAU) 4 which functions as a spectral analysis section into which is input a portion of the wavelength division multiplexed optical signal amplified by the optical amplification unit 3, and an internal supervisory control section (HUB) 5 to which all the above units are connected.

Thirty two optical signal waves of different wavelength are generated by the electro-optical converting apparatus, with eight signal waves being input into each of the four optical attenuation units $1_1 \sim 1_4$. A specific construction of the optical attenuation unit $1_1$ is shown in the figure, and an explanation thereof is given below. Explanations of the other optical attenuation units $1_2 \sim 1_4$ which are of identical construction to the optical attenuation unit $1_1$ are omitted. The optical attenuation unit $1_1$ is constructed of a series of optical processing systems $10_1 \sim 10_8$ which correspond to the wavelengths $\lambda_1 \sim \lambda_8$ being input, and a control system 16 for controlling the operation of each of the optical processing systems $10_1 \sim 10_8$.

For each of the optical processing systems $10_1 \sim 10_8$, an optical signal from the electro-optical converting apparatus is input via an optical input port (OPTIN) 11, attenuated by a variable optical attenuation module (VATTMd) 13 and then output from an optical output port (OPTOUT) 15. Furthermore, an optical input monitoring section (CPL/PD) 12 is provided between the optical input port 11 and the variable optical attenuation module 13 for monitoring such as the power of the optical signal input into the variable optical attenuation module 13, and an optical output monitoring section (CPL/PD) 14 is provided between the variable optical attenuation module 13 and the optical output port 15 for monitoring such as the power of the optical signal output from the variable optical attenuation module 13. With the present invention, the number of optical attenuation units and the number of different wavelengths within a unit can be varied as required.

Below is an explanation of a specific construction of the optical processing systems $10_1 \sim 10_8$ with reference to the block diagram of FIG. 2.

Figure 2:
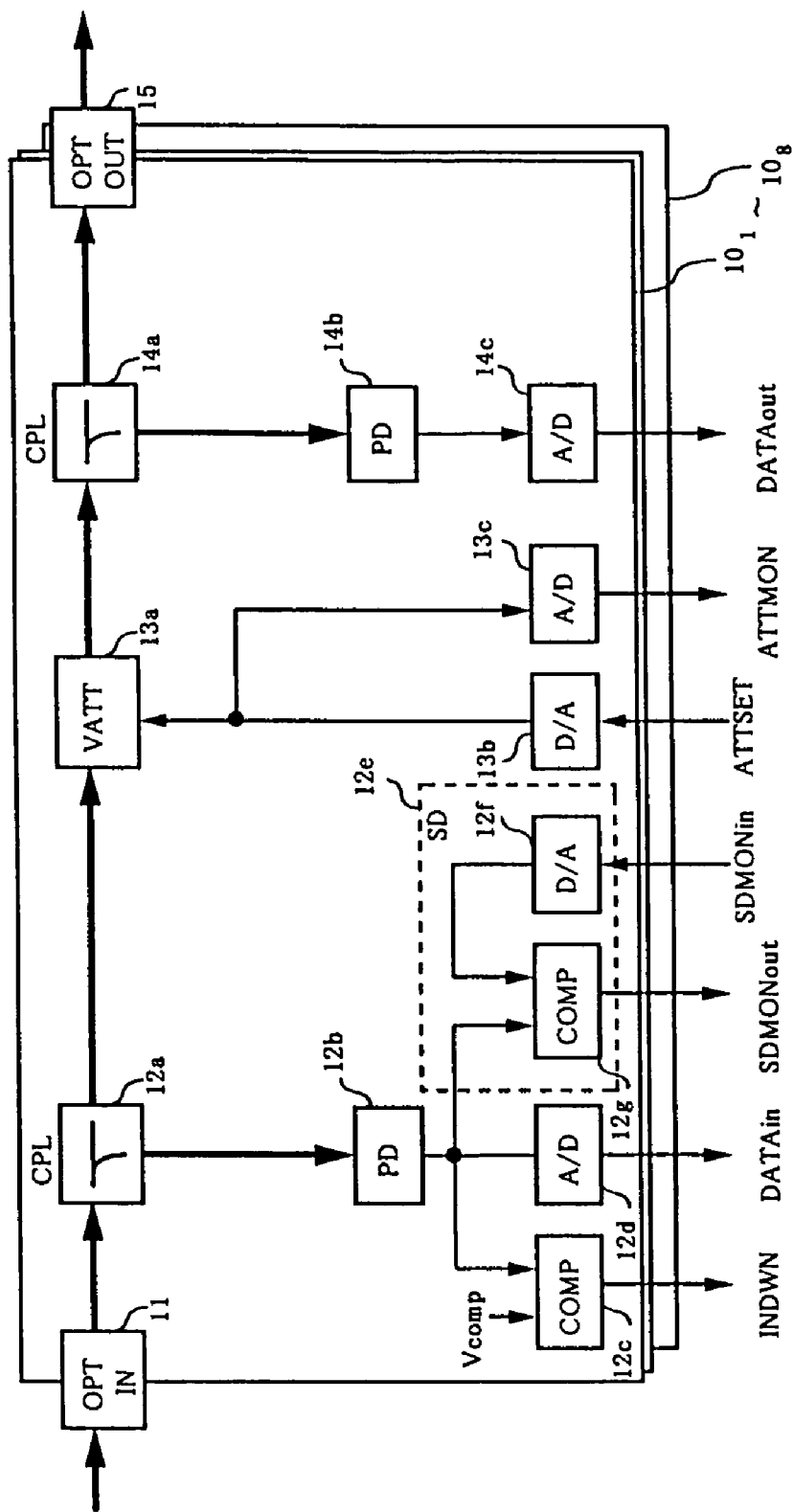
FIG. 2 is a block diagram showing a specific configuration for an optical processing system of each optical attenuation unit in the above embodiment.

In the construction of FIG. 2, an optical signal input via the optical input port 11 is sent through an optical coupler (CPL) 12a to a variable optical attenuator (VATT) 13a. At this point, a portion of the input optical signal is branched off by the optical coupler 12a with the branched optical signal being converted to an electrical signal by a photodetector (PD) 12b. The electrical signal is input into an input interruption detection circuit (COMP) 12c, an A/D conversion circuit (A/D) 12d, and a signal deterioration detection circuit (SD) 12e. The input interruption detection circuit 12c judges whether or not an optical signal is being input from the electro-optical converting apparatus by comparing the level of the electrical signal from the photodetector 12b with a preset threshold level Vcomp, and then outputs the result of the judgment to the control system 16 in the form of an input interruption signal INDWN. The A/D conversion circuit 12d converts the analog signal from the photodetector 12b into a digital signal which is able to be processed by the control system 16, and then outputs the digital signal to the control system 16 as an input data signal DATAin. The signal deterioration detection circuit 12e uses a comparison circuit (COMP) 12g to compare an analog signal converted by a D/A conversion circuit (D/A) 12f from a reference signal SDMONin sent from the control system 16 with the electrical signal from the photodetector 12b, judges whether or not any signal deterioration has occurred, and then outputs the result of the judgment to the control system 16 in the form of a signal deterioration signal SDMONout.

The amount of optical attenuation in the variable optical attenuator 13a is controlled in accordance with an analog signal converted by a D/A conversion circuit 13b to convert a control signal ATTSET sent from the control system 16. For example, in the case of a variable optical attenuator which utilizes a Faraday rotator, the amount of optical attenuation can be controlled by altering the value of electrical current flowing into the variable optical attenuator in accordance with the control signal ATTSET. An example of a variation in the amount of optical attenuation with respect to electrical current value is shown in FIG. 3. Graph (A) shows the results for measurements taken at 25° C., and graph (B) the results for measurements taken at 65° C. Furthermore, the variable optical attenuator 13a described above is also provided with a function for generating a monitor signal ATTMON which shows the actual amount of electrical current sent to the variable optical attenuator, and the monitor signal ATTMON is converted to a digital signal by an A/D conversion circuit 13c and then sent to the control system 16.

Having passed through the variable optical attenuator 13a, the optical signal passes through an optical coupler 14a and is output from the optical output port 15. At this point a portion of the output optical signal is branched off by the optical coupler (CPL) 14a with the branched optical signal being converted to an electrical signal by a photodetector (PD) 14b. The electrical signal is then converted to a digital signal by an A/D conversion circuit 14c and output to the control system 16 as an output data signal DATAout.

The control system 16 incorporates a CPU 16a which controls the amount of optical attenuation for each optical processing system $10_1$~$10_8$ based on the signals received from each optical processing system $10_1$~$10_8$ and the spectral analysis unit 4, and an interface circuit (TEDsLSI) 16b is connected to the CPU 16a. The interface circuit 16b is a connection interface for conducting signal transmission between each of the units. Furthermore, the control system 16 is also provided with a temperature monitoring circuit (TEMPMON) 16c which sends a signal showing the temperature inside the optical attenuation unit to the CPU 16a.

The optical multiplexing unit 2 comprises a multiplexing module (MUXMd) 21, which multiplexes the optical signals of each wavelength output from each of the optical attenuation units $1_1$~$1_4$ to generate a single wavelength division multiplexed optical signal, and an interface circuit (TEDsLSI) 22. The interface circuit 22 is of the same type as the interface circuit 16b provided in each of the aforementioned optical attenuation units $1_1$~$1_4$.

With the optical amplification unit 3, the wavelength division multiplexed optical signal from the optical multiplexing unit 2 is input via an optical input port (OPTIN) 31, and following amplification by an optical amplification module (AMPMd) 32, is passed through an optical coupler (CPL) 33 and output from an optical output port (OPTOUT) 34. Furthermore, an interface circuit (TEDsLSI) 35 is connected to the optical amplification module 32, and a supervisory control module (OSCSMd) 36 which monitors the operating conditions of the optical amplification unit 3 is connected to the optical coupler 33. For the optical amplification module 32, there can be utilized a known optical amplifier, such as erbium doped fiber amplifier(EDFA), which is capable of directly amplifying a wavelength division multiplexed optical signal. Although not shown in the figures, this optical amplifier is equipped with an automatic level control (ALC) circuit for controlling the output level at a constant value, and an automatic gain control (AGC) circuit for controlling the gain at a constant value, and either the ALC mode or the AGC mode is selected in accordance with a control signal sent via the interface circuit 35. The supervisory control module 36 transmits information to each module via the interface circuit 35 as to whether or not the optical amplification unit 3 is operating normally, as well as loading into the supervisory control channel of the wavelength division multiplexed optical signal, via the optical coupler 33, a supervisory control signal which shows the operating conditions of the present optical wavelength division multiplexing transmission apparatus which is to be transmitted to subsequent stage repeater devices or receiving end terminal devices. The supervisory control signal and the supervisory control channel are explained in more detail below. Moreover, a portion of the wavelength division multiplexed optical signal which has been amplified by the optical amplification module 32 is branched off at the optical coupler 33 and sent to the spectral analysis unit 4.

In the spectral analysis unit 4, the branched light from the optical coupler 33 is input via an optical input port (OPTIN) 41 and the spectrum thereof analyzed by a spectral analyzer module (SAMd) 42, with the analysis results being sent to a CPU 43. An interface circuit (TEDsLSI) 44 is connected to the CPU 43.

The interface circuits (TEDsLSI) of each of the modules are mutually interconnected, as well as being connected via the internal supervisory control section 5. Furthermore, the CPU 16a of each optical attenuation unit $1_1$~$1_4$ and the CPU 43 of the spectral analysis unit 4 are connected directly, with signal transmission occurring between the respective CPUs.

Figure 4:
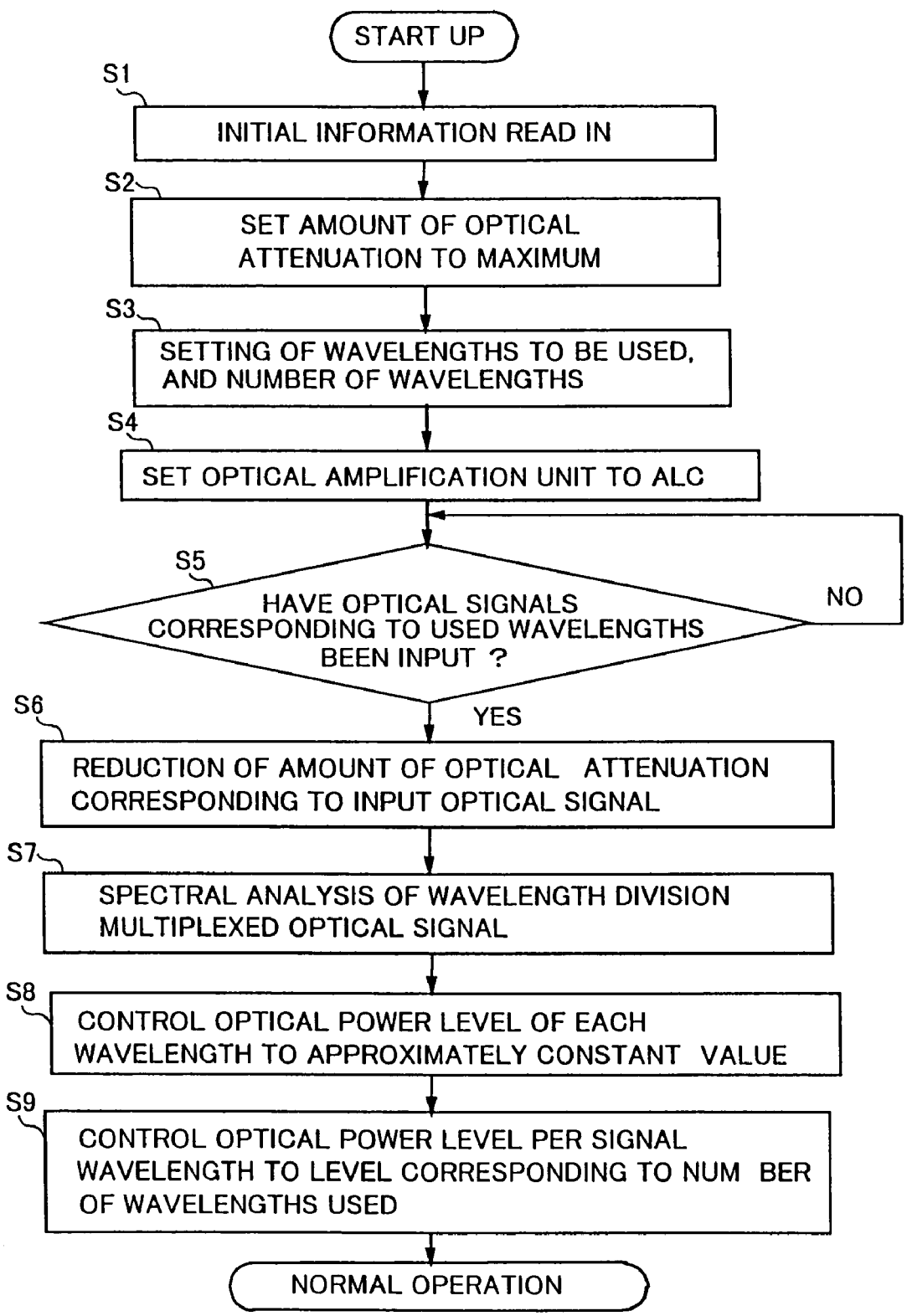
FIG. 4 is a flowchart showing a control method for the above embodiment from startup through until a point of normal operation.

Next is an explanation of a control method applicable to an optical wavelength division multiplexing transmission apparatus of a construction of the type outlined above, with reference to the flowchart of FIG. 4.

In FIG. 4, when the optical wavelength division multiplexing transmission apparatus is started up, firstly the initial settings for the optical wavelength division multiplexing transmission apparatus are performed via the processing shown in steps 1 (shown as S1 in the figure, with other steps similarly abbreviated) to step 4.

Specifically, in step 1 the initial information is read in. The initial information incorporates, for example, the wavelengths used, the number of wavelengths used and the transmission speeds for each wavelength which are set beforehand in the internal supervisory control section 5 which supervises and controls the operation of the entire transmission end terminal apparatus, and this initial information is transmitted from the internal supervisory control section 5 to each unit of the optical wavelength division multiplexing transmission apparatus. The explanation here assumes that the initial information is set by the internal supervisory control section 5, but it is also possible to have each unit of the optical wavelength division multiplexing transmission apparatus storing the appropriate initial information therefor.

In step 2, concurrently with the reading in of the initial information, processing is carried out for setting the amount of optical attenuation for all of the variable optical attenuation modules 13 of each optical attenuation unit $1_1$~$1_4$ to maximum values. This processing is achieved by sending a control signal ATTSET, which will set the amount of optical attenuation to a maximum, from the CPU 16a of each optical attenuation unit $1_1$~$1_4$ to the variable optical attenuation modules 13 corresponding to each wavelength. The control signal ATTSET is a signal which indicates the electrical current value which will produce the maximum amount of optical attenuation by taking into consideration measurement results of the temperature monitor circuit 16c as well as referring to the characteristics of the variable optical attenuator 13a as shown in FIG. 3. Data relating to the optical attenuation characteristics of the variable optical attenuator 13a corresponding to each wavelength is pre-stored. The control signal ATTSET sent from the CPU 16a to each variable optical attenuation module 13 is converted to an analog signal by the D/A conversion circuit 13b and then sent to the variable optical attenuator 13a, thus controlling the amount of electrical current flowing through the variable optical attenuator 13a and setting the amount of optical attenuation to a maximum value. Furthermore at this point, the monitor signal ATTMON, which shows the actual amount of electrical current sent to the variable optical attenuator, is sent from each variable optical attenuator 13a, through the A/D conversion circuit 13c, to the CPU 16a so that the control status of each attenuator is monitored by the CPU 16a.

In step 3, the wavelengths to be used for each of the optical attenuation units $1_1 \sim 1_4$ are set in accordance with the initial setting information read in step 1, and the number of wavelengths to be used in the optical amplification unit 3 are also set. Furthermore, the wavelengths to be used and the number of wavelengths used are also set for the spectral analysis unit 4. In step 4 the control mode for the optical amplification unit 3 is set to ALC.

The initial setting processing conducted in steps 1 to 4 puts the optical wavelength division multiplexing transmission apparatus into a standby state where it waits for the input of the optical signals of each wavelength from the electro-optical converting apparatus. In this input standby state, in step 5 detection is made as to whether or not an optical signal has been input into any of the optical input ports 11, based on the input interruption signal INDWN which is output from the input interruption detection circuit 12c corresponding to each wavelength of each optical attenuation unit $1_1 \sim 1_4$.

Then, when a judgment is made that an optical signal of a wavelength corresponding with a wavelength being used initially set has been input via the optical input port 11, the level adjustment processing of steps 6 to 9 is conducted. In the case where an optical signal of a wavelength which does not correspond with a wavelength being used initially set has been input, then the optical signal is attenuated by the variable optical attenuation module 13, of which attenuation amount has been set to maximum, and accordingly, the signal is not transmitted to any of the subsequent stage units.

First in step 6, a signal which shows that an optical signal corresponding to a wavelength being used has been input is sent from the CPU 16a of the optical attenuation unit in which there is detected the optical signal input, to the CPU 43 of the spectral analysis unit 4. The CPU 43 generates a signal to reduce the amount of optical attenuation of the variable optical attenuation module 13 corresponding to the wavelength represented by the signal from the optical attenuation unit, and responds to the CPU 16a of the optical attenuation unit. The CPU 16a then sends a control signal ATTSET to the variable optical attenuation module 13 in accordance with the signal from the CPU 43, and reduces the amount of optical attenuation.

In step 7, having passed through the optical attenuation units $1_1 \sim 1_4$ and been multiplexed in the optical multiplexing unit 2, the wavelength division multiplexed optical signal is amplified by the optical amplification unit 3, and then a portion of the signal is sent to the spectral analysis unit 4, where the spectrum of the wavelength division multiplexed optical signal following amplification is analyzed by the spectral analyzer module 42. The results from the spectral analyzer module 42 are sent to the CPU 43 and the power levels are calculated for the optical signal of each wavelength incorporated in the wavelength division multiplexed optical signal.

Next in step 8, processing is executed to control the power level of the optical signal of each wavelength at an approximately constant level. Specifically, a judgment is made by the CPU 43 as to whether or not the power level of the optical signal of each wavelength is approximately constant, and in the case where the power levels are not approximately constant, signals are generated to indicate the amount of optical attenuation for the variable optical attenuation module 13 corresponding to each of the optical attenuation units $1_1 \sim 1_4$ and these signals are output to each of the optical attenuation units so that the level differences between wavelengths are removed to obtain an equal level. On receiving the signals, each CPU 16a of the optical attenuation units $1_1 \sim 1_4$ sends a control signal ATTSET to the corresponding variable optical attenuation module 13 to adjust the amount of optical attenuation. Then, the spectrum of the wavelength division multiplexed optical signal following adjustment is reanalyzed, with the above operation being repeated until the optical power level for the optical signal of each wavelength is approximately constant.

Once the power level of the optical signal of each wavelength has been controlled to an approximately constant level, then in step 9 processing is executed for adjusting the optical power level per single wavelength of the wavelength division multiplexed optical signal input into the optical amplification unit 3 to a predetermined level corresponding to the number of the wavelength being used. Specifically, the CPU 43 detects the total power of the optical signal level being input into the optical amplification unit 3, via the interface circuit from the optical amplification unit 3, and also detects the number of optical wavelengths actually being used. With this detection results, the CPU then sets the required level for each wavelength with respect to the actual number of wavelengths being used, and judges whether or not the level of each wavelength, as measured by the spectral analysis unit 4, has reached the required level. In those cases where the required level has not been reached, a signal is generated for reducing the amount of optical attenuation of the variable optical attenuation module 13 corresponding to the wavelength being used, and is then output to the appropriate optical attenuation unit side. On receiving the signals, the CPU 16a of each optical attenuation unit $1_1 \sim 1_4$ sends a control signal ATTSET to the corresponding variable optical attenuation module 13 to adjust the amount of optical attenuation. Then, the spectrum of the wavelength division multiplexed optical signal following adjustment is reanalyzed, with the above operation being repeated until the power level of the optical signal of each wavelength has reached the required level.

In the explanation above, the power level of the optical signal of each wavelength was first controlled to give an approximately constant level, and the optical power level per single wavelength of the wavelength division multiplexed optical signal then controlled to a predetermined level. However the order of the control steps may also be reversed.

Once the optical level of each wavelength of the wavelength division multiplexed optical signal has been controlled using the above type of level adjustment processing, the optical wavelength division multiplexing transmission apparatus shifts to a normal operating state. Furthermore, even under normal operating conditions the level adjustment processing of steps 6 to 9 is repeated occasionally to control the power level of the wavelength division multiplexed optical signal.

By using the series of processing steps described above in steps 1 to 9, the operation of the optical wavelength division multiplexing transmission apparatus, from startup until the point where normal operating conditions are achieved, is carried out automatically in accordance with the optical signals actually input.

The explanation above describes the situation where the power level of the optical signal of each wavelength is controlled to give an approximately constant level. However the present invention is not limited to this situation, and for example it is also possible to control the system so that the transmission characteristics of subsequent stages to the optical wavelength division multiplexing transmission apparatus are taken into consideration with pre-emphasis being applied to the optical signal of each wavelength of approximately constant power level. This type of control can be easily achieved by adjusting the amount of optical attenuation of the variable optical attenuation module 13 of each optical attenuation unit $1_1$~$1_4$.

Next is an explanation of the control method employed in the case where the optical wavelength division multiplexing transmission apparatus is under normal operation and an increase or decrease occurs in the optical signal of each wavelengths being input.

Figure 5:
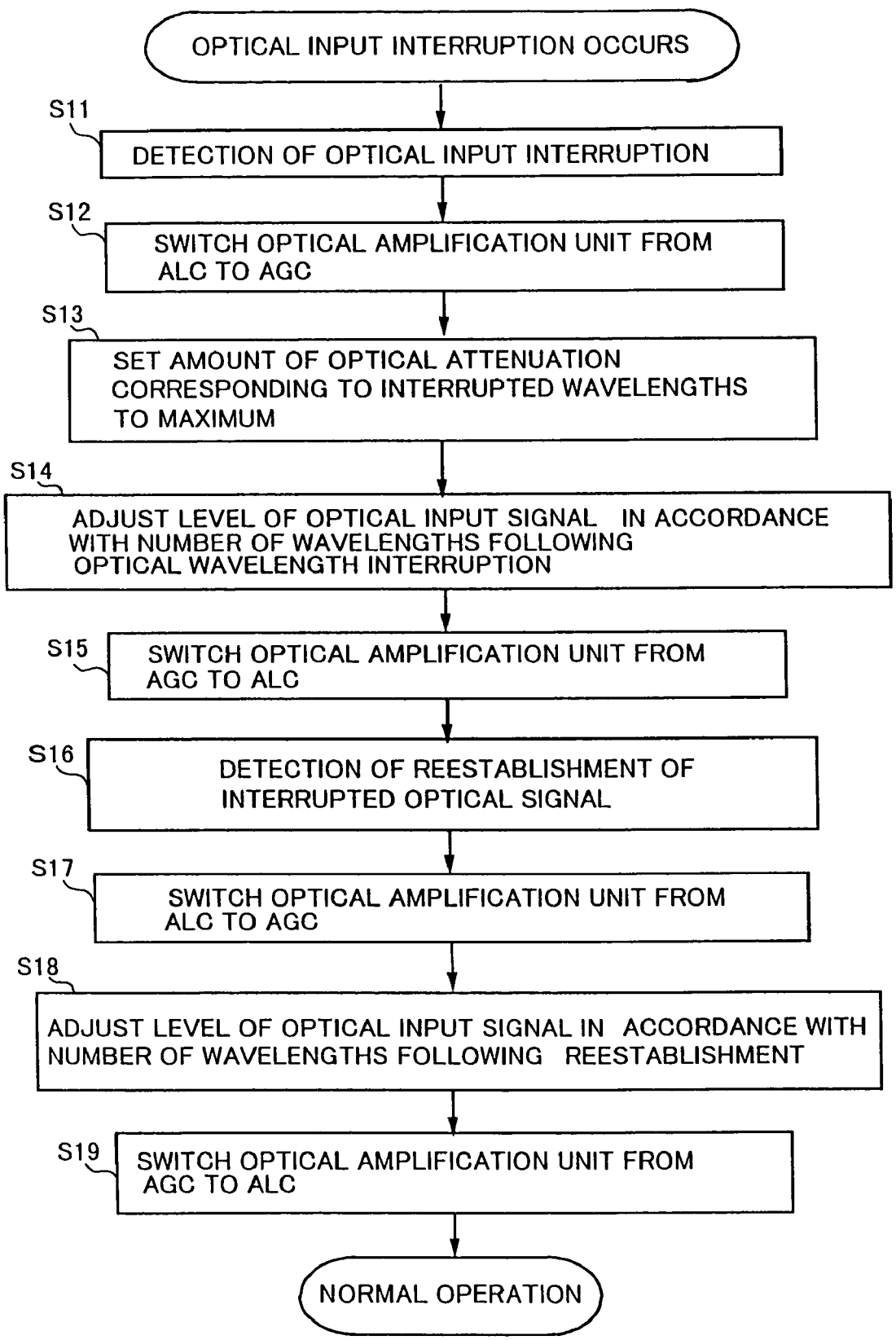
FIG. 5 is a flowchart showing a control method for the above embodiment in the case where an interruption occurs in an optical input.

First is an explanation, with reference to the flowchart of FIG. 5, of the processing carried out when the input of an optical signal of a certain wavelength disappears (hereafter referred to as an optical input interruption).

Referring to FIG. 5, in step 11, when an input interruption of an optical signal of a certain wavelength is detected based on the input interruption signals INDWN output from the input interruption detection circuit 12c of each optical attenuation unit $1_1$~$1_4$, a signal informing of the optical input interruption is sent to the CPU 43 of the spectral analysis unit 4. Furthermore, concurrently in step 12, the control mode of the optical amplification unit 3 is switched from ALC to AGC.

In step 13, processing is executed for setting the amount of optical attenuation of the variable optical attenuation module 13 corresponding to the wavelength which has been subjected to the optical input interruption to the maximum value. Specifically, a signal is sent from the CPU 43 of the spectral analysis unit 4 to the CPU 16a of the variable optical attenuation module 13 corresponding to the interrupted wavelength, requesting the amount of optical attenuation to be set to the maximum value. Then, a control signal ATTSET is sent from the CPU 16a to the variable optical attenuation module 13, the amount of optical attenuation is adjusted to the maximum value, and the system is put into a standby state, waiting for the input of the optical signal again.

Next in step 14, in order to maintain the optical power level input into the optical amplification unit 3 at a level in accordance with the new number of wavelengths being used following the optical input interruption, processing is conducted for controlling the amount of optical attenuation of the variable optical attenuation modules 13 corresponding to those wavelengths being used for which optical signals exist. Specifically, the same processing as that described above for steps 8 and 9 is repeated, based on the spectrum of the wavelength division multiplexed optical signal generated by the spectral analysis unit 4 following the optical input interruption, to control the optical power level per single wavelength to the required level while maintaining the optical signal level for each wavelength of the wavelength division multiplexed optical signal at an approximately constant level. Then, when the above level control is stabilized, the control mode of the optical amplification unit 3 is switched from AGC to ALC in step 15.

Moreover, in the case where an optical signal which has been interrupted is restored, then in step 16 the reestablishment of the optical signal is detected based on the input interruption signal INDWN from the input interruption detection circuit 12c corresponding to the wavelength concerned, and a signal conveying the detection result is sent to the CPU 43 of the spectral analysis unit 4. Furthermore, concurrently in step 17, the control mode of the optical amplification unit 3 is switched from ALC to AGC.

Then in step 18, for the optical signal of each wavelength being used, including the restored wavelength, the same processing as that described above for steps 8 and 9 is repeated, based on the spectrum of the wavelength division multiplexed optical signal generated by the spectral analysis unit 4, to thereby control the optical signal level for each wavelength of the wavelength division multiplexed optical signal to an approximately constant level, and control the optical power level per single wavelength to the required level. Then, when the above level control is stabilized, the control mode of the optical amplification unit 3 is switched back again from AGC to ALC in step 19 and normal operating conditions resumed.

The processing in steps 11 to 19 ensures that even in the case of an interruption in the input of the optical signal of a certain wavelength, the remaining optical signals of different wavelengths are automatically maintained in the same state as that prior to the input interruption, and so makes possible the transmission of a stable wavelength division multiplexed optical signal. Furthermore, the processing required when the interrupted signal is restored also occurs automatically and thus enables the transmission of a stable wavelength division multiplexed optical signal.

Next is an explanation, with reference to the flowchart of FIG. 6, of the processing carried out when the input of the optical signals of all the wavelengths being used disappear (hereafter referred to as a total optical input interruption).

The occurrence of a total optical input interruption is judged on the basis of the analysis results from the spectral analysis unit 4, and can be divided into; (A) those cases where either the spectral analysis unit 4 has malfunctioned or the input to the spectral analysis unit 4 has been interrupted, and (B) those cases where either the optical amplification unit 3 has malfunctioned or an anomaly has occurred in a stage prior to the optical amplification unit 3.

In the former case (A), if the operating condition of the optical amplification unit 3 is judged to be normal based on the signal sent to each unit from the supervisory control module 36 of the optical amplification unit 3, then a judgement is made that the spectrum of the amplified wavelength division multiplexed optical signal is simply unable to be measured and the other units are operating normally. In this case, control based on the spectrum of the wavelength division multiplexed optical signal is suspended, and by controlling each of the optical attenuation units $1_1$~$1_4$ independently it is possible to maintain the system in the same state as that prior to the total optical input interruption.

In the case described above, when a judgment is made by the spectral analysis unit 4 of a total optical input interruption as shown in step 20 of FIG. 6(A), then in step 21, independent control of the amount of optical attenuation corresponding to each wavelength is initiated for each optical attenuation unit $1_1$~$1_4$, so that the output power level of the optical signal of each wavelength is maintained at the same level as that prior to the total interruption. That is, a control signal ATTSET is sent from the CPU 16a to the optical attenuation module 13 to adjust the amount of optical attenuation so that, for the optical signal of each wavelength, the output data signal DATAout which shows the optical output level from the optical attenuation module 13 is maintained at the same state as that prior to the total interruption. The controlling of the amount of optical attenuation by the CPU 16a at this point is not affected by signals from the CPU 43 of the spectral analysis unit 4, but is controlled independently within the optical attenuation unit. At this time, the optical amplification unit 3 is set to ALC operation. Then, when the malfunction of the spectral analysis unit 4 is resolved and the total optical input interruption restored, in step 22 the optical output levels for each wavelength which had been maintained by each of the optical attenuation units $1_1$~$1_4$ are released and control of the amount of optical attenuation based on the signals from the CPU 43 of the spectral analysis unit 4 is resumed.

On the other hand in the latter case (B), when a judgement is made, based on the signal from the supervisory control module 36 of the optical amplification unit 3, that the operating state of the optical amplification unit 3 is anomalous and a total optical input interruption is detected, as shown in step 23 of FIG. 6(B), then in step 24, for each optical attenuation unit $1_1 \sim 1_4$, the amount of optical attenuation of the optical attenuation module 13 for every wavelength is set to a maximum value. Then, the system is placed in the same standby state as that described above for the initial settings, where the system then waits for the malfunctioning section to be repaired. When the anomaly is resolved and the total optical input interruption is restored, in step 25 the same processing as that employed at startup, and described above in steps 6 to 9, is repeated in accordance with the optical signals being input into each of the optical attenuation units $1_1 \sim 1_4$.

By using the control methods described above, even in the case of a total optical input interruption, as much as possible the state prior to the total interruption is maintained and the transmission state of the wavelength division multiplexed optical signal retained, and moreover, when the total optical input interruption is restored, the system is able to automatically return to normal operating conditions.

Next is an explanation of a method of achieving transmission of a stable wavelength division multiplexed optical signal by transmitting information relating to the operating state of an optical wavelength division multiplexing transmission apparatus to a repeater apparatus and a receiving end terminal apparatus.

In the case described above, where transmission of a wavelength division multiplexed optical signal is carried out while the control mode of the optical amplification unit 3 inside the optical wavelength division multiplexing transmission apparatus at the transmission end is switched, then the optical power level being input into the optical amplification unit provided in a subsequent stage repeater apparatus or in the receiving end terminal apparatus (not shown in the figures) will also vary depending on the switched state at the transmission end. If the operation of the optical amplification unit of the repeater apparatus or the receiving end terminal apparatus is set to ALC regardless of any variation in the optical input power level, then the optical output level per single wavelength at each optical amplification unit will vary, causing a deterioration in the transmission characteristics of the wavelength division multiplexed optical signal. The ALC of the amplification units of the repeater apparatus and the receiving end terminal apparatus is constantly conducted so as to absorb any typical variations in the transmission level characteristics resulting from factors such as polarization fluctuation of the transmission path, physical disturbances or age deterioration. The amplification units operating under ALC operate so as to maintain the optical output level at a constant value, based on wavelength setting information (the number of wavelengths being used and the transmission speed) which is either preset in advance or transmitted from the transmission end.

In order to avoid the type of deterioration in transmission characteristics described above, according to the embodiment of the present invention, information relating to the operating conditions at the transmission end is transmitted to subsequent stage repeater apparatus and receiving end terminal apparatus via the supervisory control channel of the wavelength division multiplexed optical signal, and the operating conditions of the optical amplification units in subsequent stages are controlled in accordance with any increase or decrease in optical signals at the transmission end. This control method is explained below with reference to the flowchart of FIG. 7.

Figure 7:
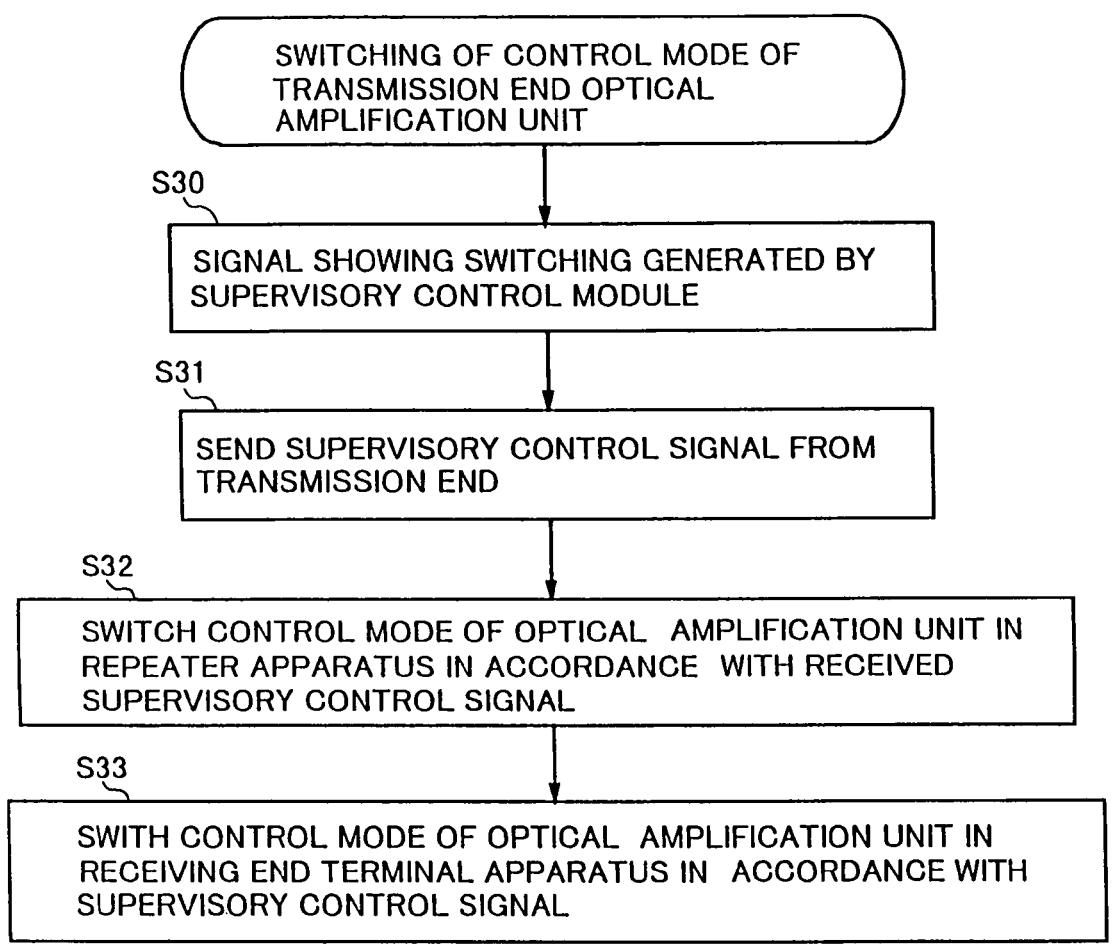
FIG. 7 is a flowchart showing a control method for the above embodiment in which a supervisory control signal is transmitted from the transmission end, and the operation of optical amplification units in subsequent stage devices is switched.
Figure 8:
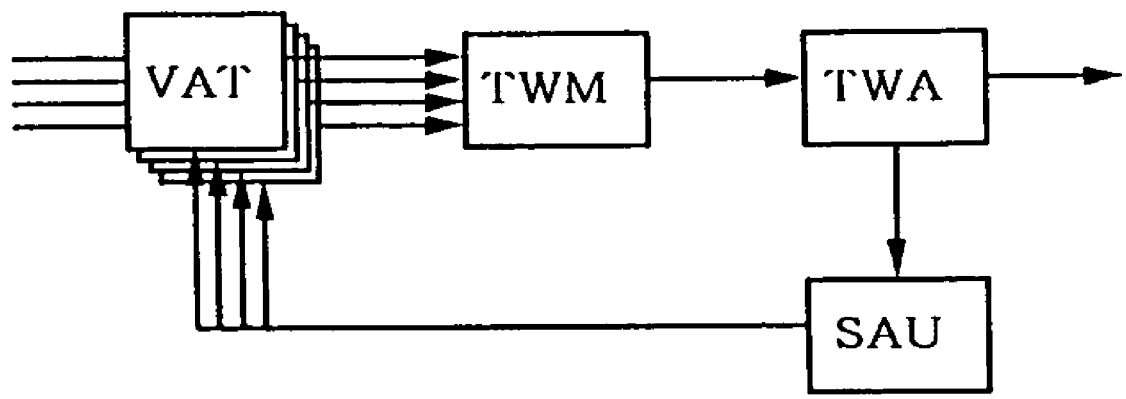
FIG. 8 is a diagram showing a typical configuration for an optical wavelength division multiplexing transmission apparatus provided in a transmission end terminal apparatus applied to a WDM optical transmission system.

In FIG. 7, when the control mode of the optical amplification unit 3 is switched by the transmission end optical wavelength division multiplexing transmission apparatus, namely when an increase or a decrease occurs in the optical signals being input into the optical wavelength division multiplexing transmission apparatus, and the control mode of the optical amplification unit 3 is altered in the manner described above, either from ALC to AGC or from AGC to ALC, then in step 30, a signal showing the switched control mode is generated by the supervisory control module 36 of the optical amplification unit 3. In step 31, this signal together with signals which show information such as the number of wavelengths being used and the transmission speed for each wavelength, is inserted via the optical coupler 33 into the supervisory control channel of the wavelength division multiplexed optical signal as the supervisory control signal, and then output from the optical output port 34.

Then in step 32, the supervisory control signal from the transmission end is received by the repeater apparatus, and the control mode of the optical amplification unit provided in the repeater apparatus is switched in accordance with the information showing the control mode, which is incorporated within the received supervisory control signal. Specifically, in the case where, for example, an optical interruption occurs for a certain wavelength and the control mode of the optical amplification unit at the transmission end has switched from ALC to AGC, then the optical amplification unit of the repeater apparatus will also be switched from ALC to AGC. Furthermore, when the optical interruption is restored, by means of the above operation, the fact that the optical amplification unit at the transmission end is operating under ALC is relayed to the optical amplification unit of the repeater apparatus, which is then also operated under ALC conditions. This type of switching processing is carried out sequentially at each repeater apparatus connected between the transmission end and receiving end terminal apparatus, and the wavelength division multiplexed optical signal from the transmission end is transmitted to the receiving end terminal apparatus.

In step 33, the supervisory control signal from the transmission end passes through the repeater apparatus and is received at the receiving end terminal apparatus, and the control mode of the optical amplification unit provided in the receiving end terminal apparatus is switched in accordance with the information showing the control mode incorporated within the received supervisory control signal, in the same manner as that described for step 32.

By using the processing in steps 30 to 33, which utilizes the supervisory control channel of the wavelength division multiplexed optical signal to transmit the control mode of the optical amplification unit at the transmission end to the repeater apparatus and the receiving end terminal apparatus and then switches the control mode of each subsequent stage optical amplification unit to match that at the transmission end, then even in those cases such as an optical input interruption, where there is an increase or decrease in the number of wavelengths incorporated in the wavelength division multiplexed optical signal, stable wavelength division multiplexed optical transmission can be achieved.

With the above control method it is also possible to transmit information, using the supervisory control channel, from the repeater apparatus or the receiving end terminal apparatus back to the transmission end terminal apparatus, as to whether or not the switching of the control mode of each optical amplification unit within the repeater apparatus and the receiving end terminal apparatus has occurred normally. With this method, in those situations where maintenance personnel of the transmission system carry out actual increases or decreases in the wavelengths via such as the internal supervisory control section 5, confirmation can be made as to whether or not the terminal apparatus and repeater apparatus are performing control functions in a normal manner by a command response which uses the supervisory control channel. In the case where, for example, the control mode of the optical amplification unit in a repeater apparatus is unable to be correctly switched, this confirmation action informs the maintenance personnel of an inability to increase or decrease the number of wavelengths, and so the actual action of increasing or decreasing the number of wavelengths can be halted to avoid any effect on the operational communication wavelengths.

What we claimed are:

1. A method of controlling an optical wavelength division multiplexing transmission apparatus which is equipped with an optical attenuation section for attenuating individually the power level of each of a plurality of input optical signals of different wavelengths, corresponding to each of the wavelengths, an optical multiplexing section disposed in a stage subsequent to the optical attenuation section, for multiplexing the optical signals of each wavelength which have been attenuated by said optical attenuation section and generating a wavelength division multiplexed optical signal, an optical amplification section for amplifying the wavelength division multiplexed optical signal generated by said optical multiplexing section, and a spectral analysis section for analyzing the spectrum of the wavelength division multiplexed optical signal amplified by said optical amplification section, wherein said method comprises:

upon startup of said optical wavelength division multiplexing transmission apparatus, setting initial information including the wavelengths being used and the number of wavelengths being used, setting the amount of optical attenuation corresponding to each wavelength of said optical attenuation section to a maximum value, and setting the operation of said optical amplification section to automatic level control;

upon input to an optical signal of a wavelength corresponding to the wavelengths being used set in said initial information into said optical attenuation section, controlling the amount of optical attenuation corresponding to the wavelength of the optical signal being input into said optical attenuation section so that the power level of the optical signals of each wavelength analyzed by said special analysis section is approximately constant, and moreover so that the optical power lever per single wavelength of the wavelength division multiplexed optical signal input into said optical amplification section is of a level which corresponds with the number of wavelengths being used set in said initial information;

based on the analysis results from said spectral analysis section, controlling the amount of optical attenuation corresponding to the wavelength of the optical signal being input into said optical attenuation section, so that the level conditions adjusted by said controlling the amount of optical attenuation, are maintained; and upon a variation in the number of wavelengths being input, switching the operation of said optical amplification section from automatic level control to automatic gain control, and individually controlling the amount of optical attenuation corresponding to each wavelength of the optical signal being input into said optical attenuation section so that the power level of the optical signal of each wavelength analyzed by said spectral analysis section is approximately constant, and moreover so that the optical power level per single wavelength of the wavelength division multiplexed optical signal input into said optical amplification section is of a level which corresponds with the varied number of wavelengths.

2. A method of controlling an optical wavelength division multiplexing transmission apparatus according to claim 1 wherein said switching the operation of said optical amplification section comprises, upon any reduction in the umber of input wavelengths, setting the amount of optical attenuation corresponding to the interrupted wavelengths of said optical attenuation section to a maximum value.

3. A method of controlling an optical wavelength division multiplexing transmission apparatus according to claim 1, further comprising, upon occurrence of an anomaly in the analysis operation of said spectral analysis section controlling the amount of optical attenuation corresponding to each wavelength in said optical attenuation section so that the level of the optical signal of each wavelength output from said optical attenuation section is maintained at the output level which existed immediately prior to the occurrence of the anomaly.

4. A method of controlling an optical wavelength division multiplexing transmission apparatus according to claim 1, wherein, when the operation of said optical amplification section is switched to either automatic level control or automatic gain control, said method further comprises generating a supervisory control signal, which shows at least the operating conditions of said optical amplification section following switching, and then sending it to the transmission path, wherein said supervisory control signal is used for switching the operation of optical amplification sections incorporated in subsequent stage devices connected to said transmission path so as to match the operating conditions of the optical amplification section of said wavelength division multiplexing optical transmission apparatus.

5. A method of controlling an optical wavelength division multiplexing transmission apparatus according to claim 4, wherein said generating the supervisory control signal utilizes a supervisory control channel of different wavelength from the wavelengths of the optical signals incorporated in said wavelength division multiplexed optical signal, to send said supervisory control signal to the optical transmission path together with said wavelength division multiplexed optical signal.

6. A method of controlling an optical wavelength division multiplexing transmission apparatus having an optical amplification section, comprising:

setting initial information including a number of wavelengths being used in the optical wavelength division multiplexing transmission apparatus and the wavelengths being used;

setting an amount of optical attenuation corresponding to each of the wavelengths to a maximum value, and setting the operation of the optical amplification section to automatic level control;

determining when a variation in the number of wavelengths being input occurs; and when a variation in the number of wavelengths being input occurs, switching the operation of the optical amplification section from automatic level control to automatic gain control, and individually controlling an amount of optical attenuation corresponding to each wavelength of the optical signal being input, so that the power level of the optical signal is approximately constant, and so that the optical power level per single wavelength of the wavelength division multiplexed optical signal input into the optical amplification section is of a level which corresponds to the varied number of wavelengths.

7. A method of controlling an optical wavelength division multiplexing transmission apparatus having an optical amplification section, comprising:

sending initial information including a number of wavelengths being used in the optical wavelength division multiplexing transmission apparatus;

setting the operation of the optical amplification section to automatic level control;

determining when a variation in the number of wavelengths being input occurs; and when a variation in the number of wavelengths being input occurs, switching the operation of the optical amplification section from automatic level control to automatic gain control, and individually controlling an amount of optical attenuation corresponding to each wavelength of the optical signal being input.

* * * * *